United States Patent
Priyadarshi (10) Patent No.: US 8,682,172 B2
(45) Date of Patent: Mar. 25, 2014

(54) OPTOELECTRONIC COMMUNICATIONS ASSEMBLY HAVING AN ELECTRICAL AND OPTICAL INTERFACE

(75) Inventor: Sunil Priyadarshi, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 572 days.

(21) Appl. No.: 12/852,901

(22) Filed: Aug. 9, 2010

(65) Prior Publication Data

US 2012/0033979 A1 Feb. 9, 2012

(51) Int. Cl.
*H04B 10/00* (2013.01)

(52) U.S. Cl.
USPC ............. 398/135; 398/139; 398/164; 398/33; 398/38; 398/25; 398/28; 398/9; 385/88; 385/89; 385/90; 385/92; 385/93; 356/73.1

(58) Field of Classification Search
USPC ......... 398/135, 136, 137, 138, 139, 164, 141, 398/158, 159, 33, 38, 25, 26, 27, 28, 9; 385/88, 89, 90, 92, 93, 14, 53, 76, 77; 356/73.1
See application file for complete search history.

(56) References Cited

U.S. PATENT DOCUMENTS

| | | | |
|---|---|---|---|
| 5,966,487 A | 10/1999 | Gilliland et al. | |
| 6,890,206 B2 | 5/2005 | Distad et al. | |
| 7,097,468 B2 | 8/2006 | Ice | |
| 7,226,217 B1 * | 6/2007 | Benton et al. | 385/89 |
| 8,233,804 B2 * | 7/2012 | Aguren | 398/115 |
| 2005/0232636 A1 * | 10/2005 | Durrant et al. | 398/139 |
| 2006/0045409 A1 | 3/2006 | Tatum et al. | |
| 2006/0128221 A1 | 6/2006 | Yoshikawa et al. | |
| 2007/0237471 A1 | 10/2007 | Aronson et al. | |
| 2009/0148106 A1 * | 6/2009 | Moore et al. | 385/89 |

OTHER PUBLICATIONS

U.S. Appl. No. 12/181,484, filed Jul. 8, 2010, Office Action.

* cited by examiner

*Primary Examiner* — Hanh Phan
(74) *Attorney, Agent, or Firm* — Maschoff Brennan (57) ABSTRACT

In one example embodiment, an optoelectronic communications assembly having an optical receiver or an optical transmitter includes an optical interface disposed at an end thereof and through which optical signals are communicated by the optical receiver or optical transmitter. The optoelectronic communications assembly also includes an electronic component and a first electrical interface disposed at the optical interface end of the optical communications assembly and communicatively coupled to the electronic component.

18 Claims, 8 Drawing Sheets

OPTOELECTRONIC COMMUNICATIONS ASSEMBLY HAVING AN ELECTRICAL AND OPTICAL INTERFACE

BACKGROUND

Optoelectronic communications modules (also called assemblies), including fiber optical transmitters, receivers, transceivers, and transponders, are increasingly used in modern technology. An optoelectronic communications assembly will typically include optoelectronic or electro-optic circuitry and supporting circuitry that accomplish control, setup, monitoring, and identification operations, among other things. Basic supporting circuits within an optoelectronic assembly may include a controller or processor, a laser driver circuit, which accepts high speed digital data and electrically drives an LED or laser diode to create equivalent optical pulses, and/or a receiver circuit which takes relatively small signals from an optical detector and amplifies and limits them to create a uniform amplitude digital electronic output.

In addition to these circuits, an optoelectronic assembly may include identification circuitry. For example, a general purpose memory device, typically EEPROM (electrically erasable and programmable read only memory) or other non-volatile memory may be communicatively coupled to a controller or processor of the optoelectronic assembly. The memory is accessible to a host into which the optoelectronic assembly is installed, typically via a pluggable connection. For example, the optoelectronic assembly includes a host serial bus coupled to a host serial interface controller that controls the host serial bus. The host serial bus includes an electrical interface located on a side of the optoelectronic assembly facing the host. The host serial bus can be an $I^2C$ (Inter-IC) or MDIO bus. An $I^2C$ bus is a bi-directional two-wire serial bus that provides a communication link between integrated circuits. An MDIO bus is a Management Data Input/Output bus, as described by the IEEE 802.3 specification. Alternatively, another bi-directional serial interface could be used.

The memory device is used to store various information identifying, e.g., the optoelectronic assembly type, capability, serial number, compatibility with various standards, subcomponent revisions, and factory test data. The memory device may also store firmware and operational parameters, such as power on time, end-of-life data, and temperature compensation tables or functions. The memory device is typically accessible via a host, such as a computer or server, into which the optoelectronic assembly is installed or plugged. However, accessing the data stored in the memory device via the host can often be inconvenient or time-consuming. Moreover, it may be desirable to write data to the memory device that is associated with or identifies a particular fiber optic cable used by the optoelectronic assembly to interface with an optical network. Thus, other methods and media are desired for accessing data stored in a memory device of an optoelectronic communications assembly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In general, example embodiments of the invention relate to unique optoelectronic communications assemblies, communications media and other devices, such as diagnostic meters, that are compatible with the unique optoelectronic assemblies, and methods of using and configuring the unique optoelectronic assemblies.

In one example embodiment, an optoelectronic communications assembly having an optical receiver or an optical transmitter includes an optical interface disposed at an end thereof and through which optical signals are communicated by the optical receiver or optical transmitter. The optoelectronic communications assembly also includes an electronic component and a first electrical interface disposed at the optical interface end of the optical communications assembly and communicatively coupled to the electronic component.

In a second example embodiment, an optoelectronic communications assembly includes an optical connector port having an electrical interface through which the optical receiver or optical transmitter communicates. The electrical interface may be used for communications with a memory device on the optoelectronic communications assembly.

In a third example embodiment, a communications media that is compatible with one of the foregoing optoelectronic communications assembly embodiments includes a fiber optic connector disposed at an end of the communications media. The fiber optic connector physically conforms with a fiber optic connector standard. Moreover, the fiber optic connector includes an electrical contact exposed on a side thereof. The electrical contact may be placed so that when the fiber optic connector is plugged into an optical connector port of an optoelectronic communications assembly the electrical contact physically contacts a corresponding electrical contact located within the optical connector port.

In a fourth example embodiment, a communications device includes an optical connector port that physically conforms with a fiber optic connector standard. In addition, the optical connector port has an electrical interface. The electrical interface may be used for communications over a specially adapted patch cord to access data stored in a memory device of an optoelectronic communications assembly.

In a fifth example embodiment, a method for configuring an optoelectronic communications assembly includes two stages. First, a connector may be inserted into an optical connector port of an optoelectronic communications assembly. The optical connector port may have an electrical interface and the connector may have a corresponding electrical interface. Next, configuration data associated with the optoelectronic communications assembly may be read via the electrical interfaces.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

Example embodiments of the present invention relate to an optoelectronic communications module or optoelectronic assembly having an electrical interface on an optical interface side. The electrical interface is integrated with the optical interface such that when an optical connector having a corresponding electrical interface is plugged into an optical connector port of the optical interface, an electrical connection is formed between the optical connector port and the optical connector. Consequently both optical and electrical communications are possible when the optical connector is plugged into the optical connector port.

The electrical interface provides optical-side access to an on-board memory device of the optoelectronic assembly. The memory device may store among other things, identification data associated with the optoelectronic assembly and/or a fiber optic cable assigned to the optoelectronic assembly according to a predetermined network configuration. Therefore, a diagnostic meter or other optoelectronic assembly can be provided with convenient access to such data via the optical connector port.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

1. Example Optoelectronic Transceiver Assembly

Figure 1A:
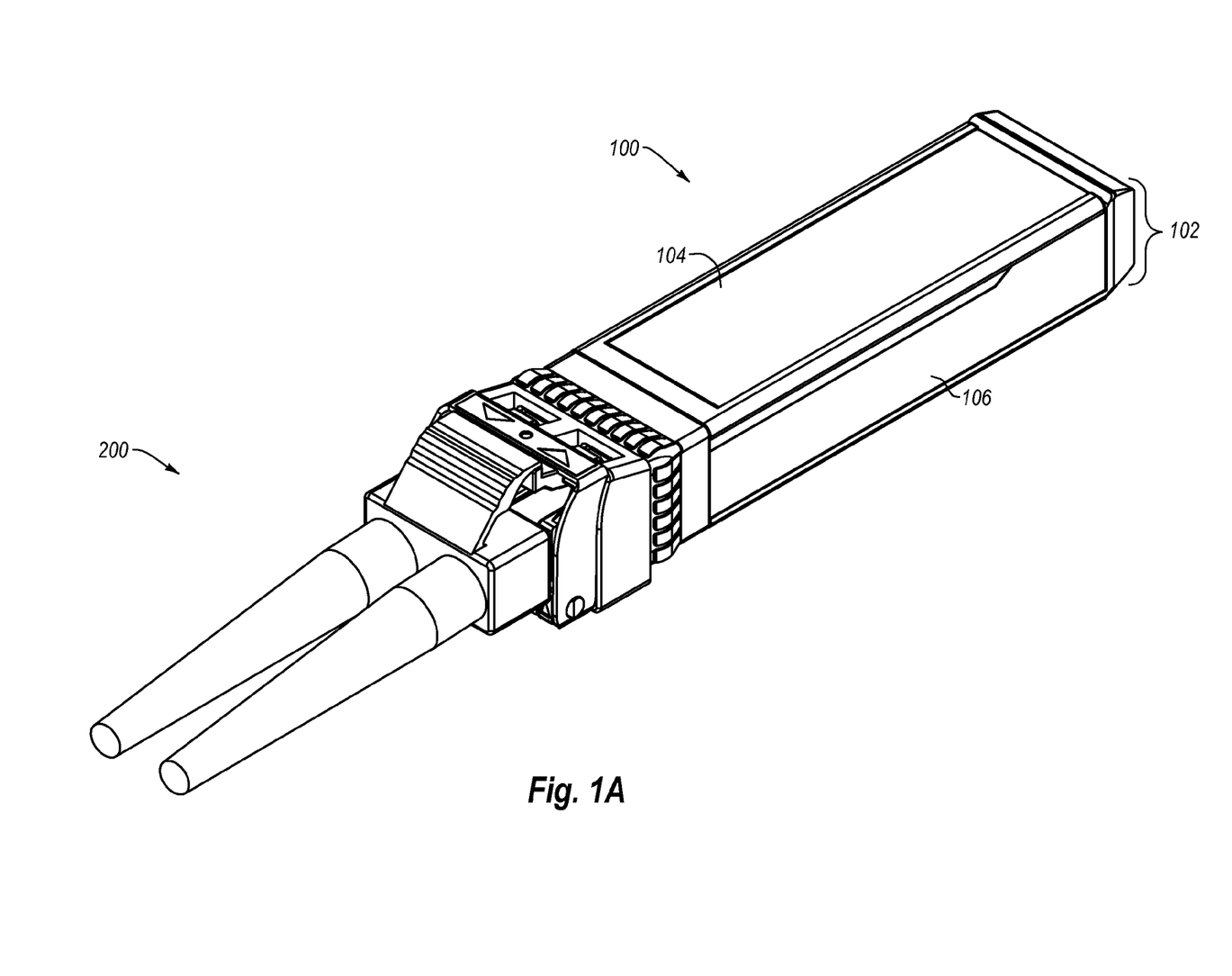
FIGS. 1A-1C disclose aspects of an example optoelectronic communications assembly.
Figure 1B:
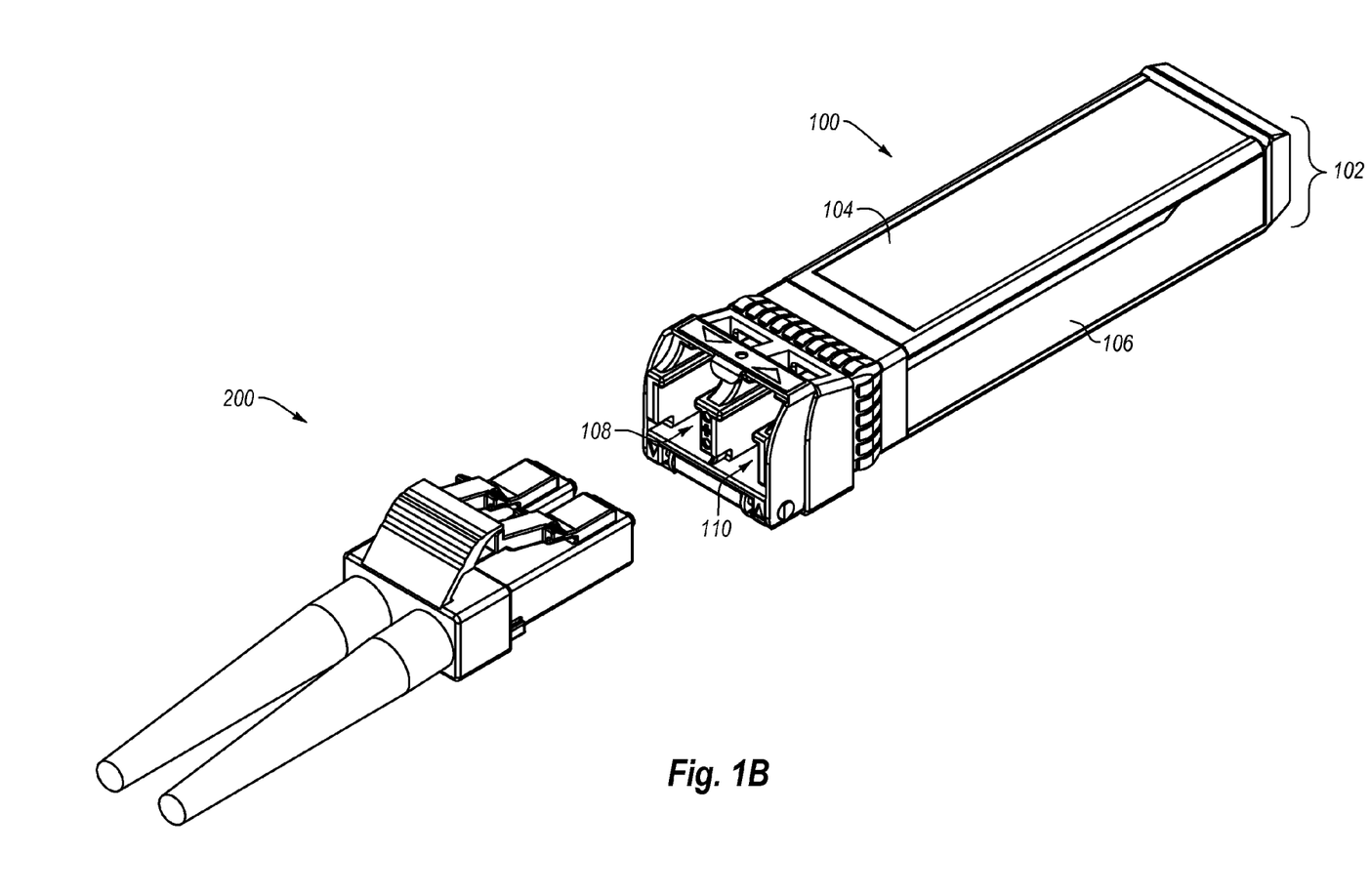
Figure 1C:
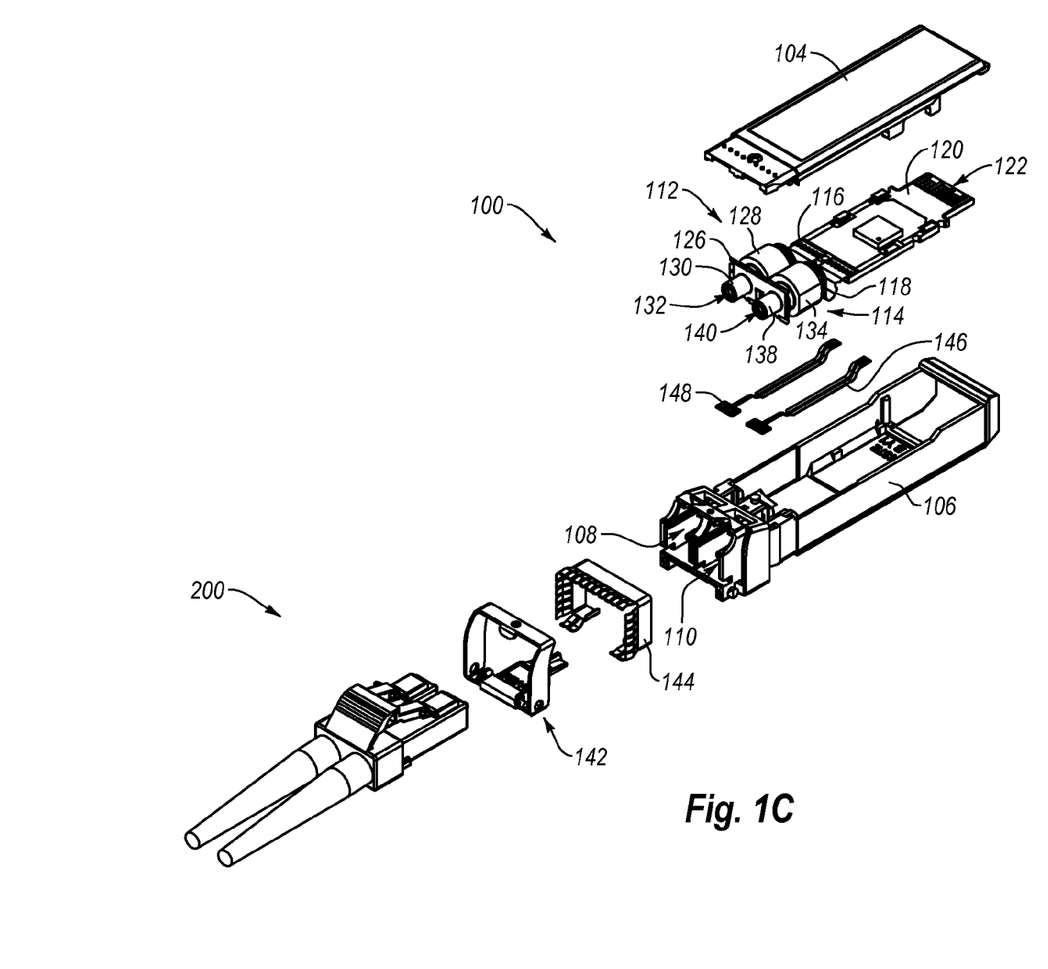

Reference is first made to FIGS. 1A-1C which disclose an example optoelectronic assembly 100 for use in transmitting and receiving optical signals in connection with a host device (not shown). FIGS. 1A-1C also disclose an example optical fiber connector 200 that is used to transmit and receive signals generated by and sent to the optoelectronic assembly 100. As shown in the figures, two fiber optic cables, one for transmitting signals and the other for receiving signals, may be integrated with and extend from the optical fiber connector 200. In FIG. 1A the optical fiber connector 200 is plugged into the optoelectronic assembly 100, whereas an unplugged arrangement is depicted in FIG. 1B. FIG. 1C depicts an exploded view of the optoelectronic assembly 100.

As disclosed in FIGS. 1A and 1B, the optoelectronic assembly 100 includes various components, including a shell 102 that includes a rotatable top shell 104 and a bottom shell 106, and an output receptacle or port 108 and an input receptacle or port 110 defined in the bottom shell 106. The rotatable top shell 104 and the bottom shell 106 can be formed using a die casting process. One example material from which the rotatable top shell 104 and the bottom shell 106 can be die cast is zinc, although the rotatable top shell 104 and the bottom shell 106 may alternatively be die cast from other suitable materials.

The output and input ports 108 and 110 have surfaces or walls that are shaped to form an opening adapted to receive the optical fiber connector 200. The ports 108 and 110 are configured such that when the optical fiber connector 200 is inserted therein, fiber optic cables 201 (best seen in FIG. 4) protruding into the ports from the optical fiber connector 200 are aligned with corresponding light emitting and receiving components in the optoelectronic assembly 100.

As disclosed in FIG. 1C, the example optoelectronic assembly 100 also includes a transmitter optical subassembly (TOSA) 112, a receiver optical subassembly (ROSA) 114, flexible connectors 116 and 118, and a PCB 120 having an edge connector 122. The two flexible connectors 116 and 118 are used to electrically connect the TOSA 112 and the ROSA 114, respectively, to the PCB 120. An OSA positioning plate 126 is included to secure the TOSA 112 and the ROSA 114 within the optoelectronic assembly 100.

The TOSA 112 of the optoelectronic assembly 100 includes a barrel 128 within which an optical transmitter, such as a laser, (not shown) is disposed. The optical transmitter is configured to convert electrical signals received through the flexible connector 116 and the PCB 120 from a host device (not shown) into corresponding optical signals. The TOSA 112 also includes a nose piece 130. The nose piece 130 defines an opening 132. The opening 132 is configured to optically connect the optical transmitter disposed within the barrel 128 of the TOSA 112 with a fiber-ferrule of the optical connector 200 when the optical connector 200 is plugged into the output port 108.

Similarly, the ROSA 114 of the optoelectronic assembly 100 includes a barrel 134 and a nose piece 138. The nose piece 138 defines a port 140. The port 140 is configured to optically connect an optical receiver, such as a photodiode (not shown), disposed within the barrel 134 to a fiber-ferrule of the optical connector 200 when the optical connector 200 is plugged into the input port 110. The optical receiver is configured to convert optical signals received from the fiber-ferrule into corresponding electrical signals for transmission to a host device (not shown) through the flexible connector 118 and the PCB 120.

The optoelectronic assembly 100 can be configured for optical signal transmission and reception at a variety of per-second data rates including, but not limited to, 1 Gbit, 2 Gbit, 2.5 Gbit, 4 Gbit, 8 Gbit, 10 Gbit, or higher. Furthermore, the optoelectronic assembly 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic assembly 100 can be configured to support various transmission standards including, but not limited to, Fast Ethernet, Gigabit Ethernet, 10 Gigabit Ethernet, and 1x, 2x, 4x, and 10x Fibre Channel. In addition, although one example of the optoelectronic transceiver assembly 100 is configured to have a form factor that is substantially compliant with the small form-factor pluggable ("SFP") multi-source agreement ("MSA"), the optoelectronic transceiver assembly 100 can alternatively be configured to have a variety of different form factors that are substantially compliant with other MSAs including, but not limited to, the small form-factor ("SFF") MSA, the SFP plus MSA, or the 10 Gbit/s miniature device ("XMD") MSA.

With continued reference to FIGS. 1A-1C, the optoelectronic assembly 100 may also include various elements, such as a latching mechanism 142, a collar clip 144, and a flexible connector 146. The flexible connector 146 provides a communications media between an electrical interface 148 and a memory device (not shown) mounted on the PCB 120 of the optoelectronic assembly 100, thereby providing optical-side electrical access to the memory device. The flexible connector 146 and the electrical interface 148 will be discussed in greater detail below in connection with FIGS. 2 and 3.

2. Example Electrical Interface and Flexible Connector

Figure 2:
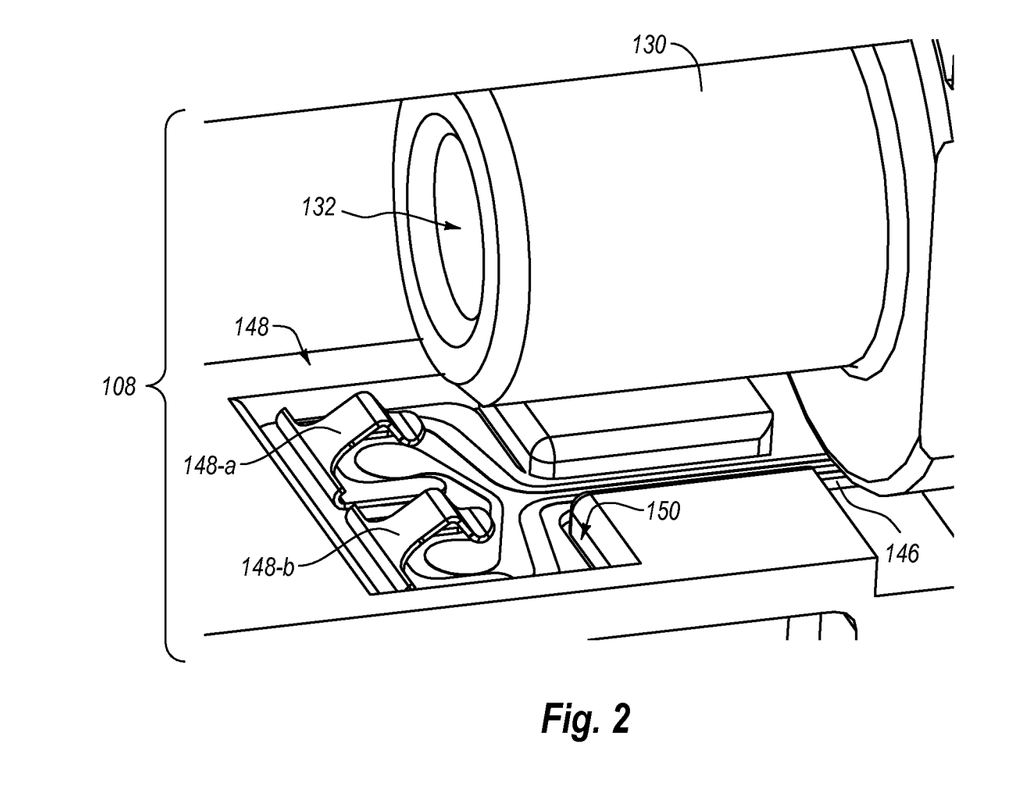
FIG. 2 is a cutaway view of an example electrical interface on an optical interface side of the example optoelectronic communications assembly of FIGS. 1A-1C.

With continuing reference to FIG. 1C, and with reference now to FIG. 2, aspects of an example electrical interface 148 are disclosed. The electrical interface 148 may be located within the output port 108 and, in particular, below the nose piece 130 of the TOSA 112, as shown. The electrical interface 148 includes a first exposed electrically conductive contact 148-a and a second exposed electrically conductive contact 148-b.

The first and second contacts 148-a and 148-b may be metal contacts shaped in the form of leaf-spring contacts, as shown, which yield to permit passage of an optical connector into the output port 108. Two contacts are used in one example embodiment in accordance with the I$^2$C bus standard, which requires two communication lines—a serial data line and a clock line. One of the contacts, e.g., the first contact 148-a, may be dedicated for a clock signal while the other contact, e.g., the second contact 148-b, may be dedicated for a data signal. In an alternative embodiment, however, only a single exposed contact forms the electrical interface 148. A single contact may be used to communicate a data signal if, for example, circuitry that communicates over the electrical interface 148 is capable of asynchronous communication. Moreover, an embodiment of the electrical interface 148 having more than two contacts is contemplated, which may be used for communicating a plurality of control or data signals or to accommodate a parallel communications bus.

Figure 3:
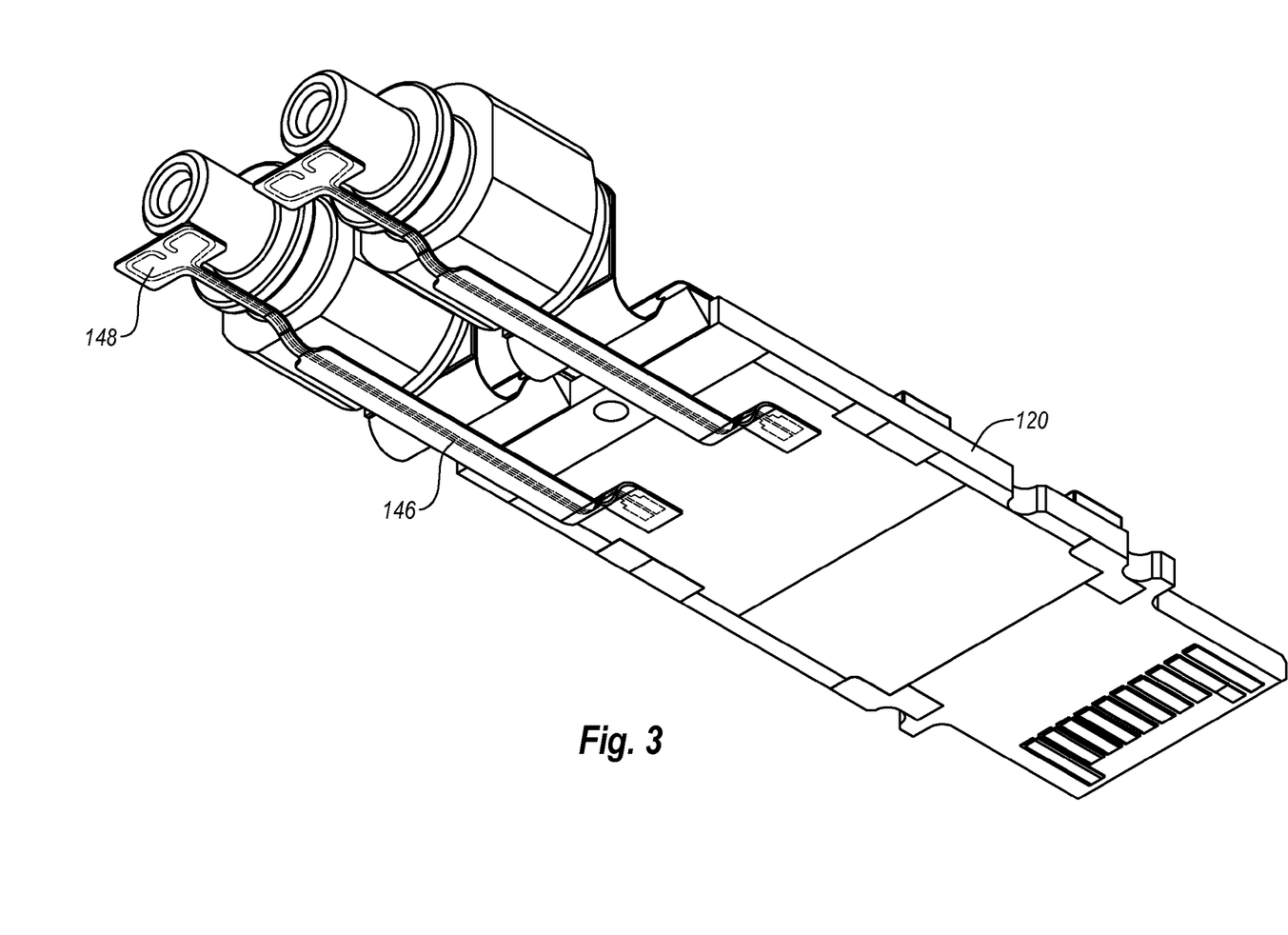
FIG. 3 is a perspective view of an example flexible connector coupled to the example electrical interface of FIG. 2.

FIGS. 2 and 3 show details of the flexible connector 146 and its position relative to the other components of the optoelectronic assembly 100. The flexible connector 146 may include flexible conductive electrical lines that are at least partially encased in a dielectric material. The flexible conductive electrical lines may be made of a metal such as, but not limited to, copper or a copper alloy. Moreover, the dielectric material may be made of a laminate such as, but not limited to, a thermoplastic polyimide. The first and second contacts 148-a and 148-b are coupled to exposed ends of the electrical lines encased in the flexible connector 146 using, e.g., a solder paste.

As shown in FIG. 2, a first end of the flexible connector 146 that is coupled to the first and second contacts 148-a and 148-b is arranged to lay within in an indentation or depression 150 formed in an inner wall of the output port 108. The first end of the flexible connector 146 may be secured by an adhesive, such as an epoxy, applied to an underside of the flexible connector 146, which is opposite the side to which the electrical contacts 148-a and 148-b are coupled. A cavity (not shown) located in a generally central region of the depression 150 may be formed to accommodate placement of the adhesive that secures the flexible connector 146 to the inner wall of the output port 108.

With further reference to FIG. 2, the depression 150 is shaped to accommodate the shape of the flexible connector 146 and extends toward the PCB 120 to allow passage of the flexible connector 146 therethrough. Moreover, as shown in the exploded view of FIG. 3, the flexible connector 146 extends toward the PCB 120 and is electrically coupled to exposed contacts (not shown) on the PCB 120 at a second end thereof opposite the first end. The PCB contacts to which the flexible connector 146 is coupled provide communicative access to the memory device (not shown) mounted on the PCB 120. The communicative access may be direct or indirect. For example, the flexible connector 146 may be coupled to contacts that are directly coupled to pins of an electronic component or processor including, for example, a main processor chip or a memory controller chip, which provides access to data stored in the memory device. Alternatively, one or both of the PCB contacts to which the flexible connector 146 is coupled may be directly coupled to pins of the memory device. Thus, the flexible connector 146 provides a communicative channel between the memory device on the PCB 120 and the electrical contacts 148-a and 148-b located in the depression 150 of the output port 108.

Although the electrical interface 148 is shown as being disposed in the output port 108, the electrical interface 148 may instead be disposed in the input port 110 (e.g., below the nose piece 138 of the ROSA 114). Alternatively, another electrical interface may be formed in the input port 110 in addition to the electrical interface 148 shown in the output port 108. Moreover, the depression 150 and the electrical interface 148 may be located in a different inner wall of either the port 108 or the port 110.

3. Example Optical Fiber Connector

Figure 4:
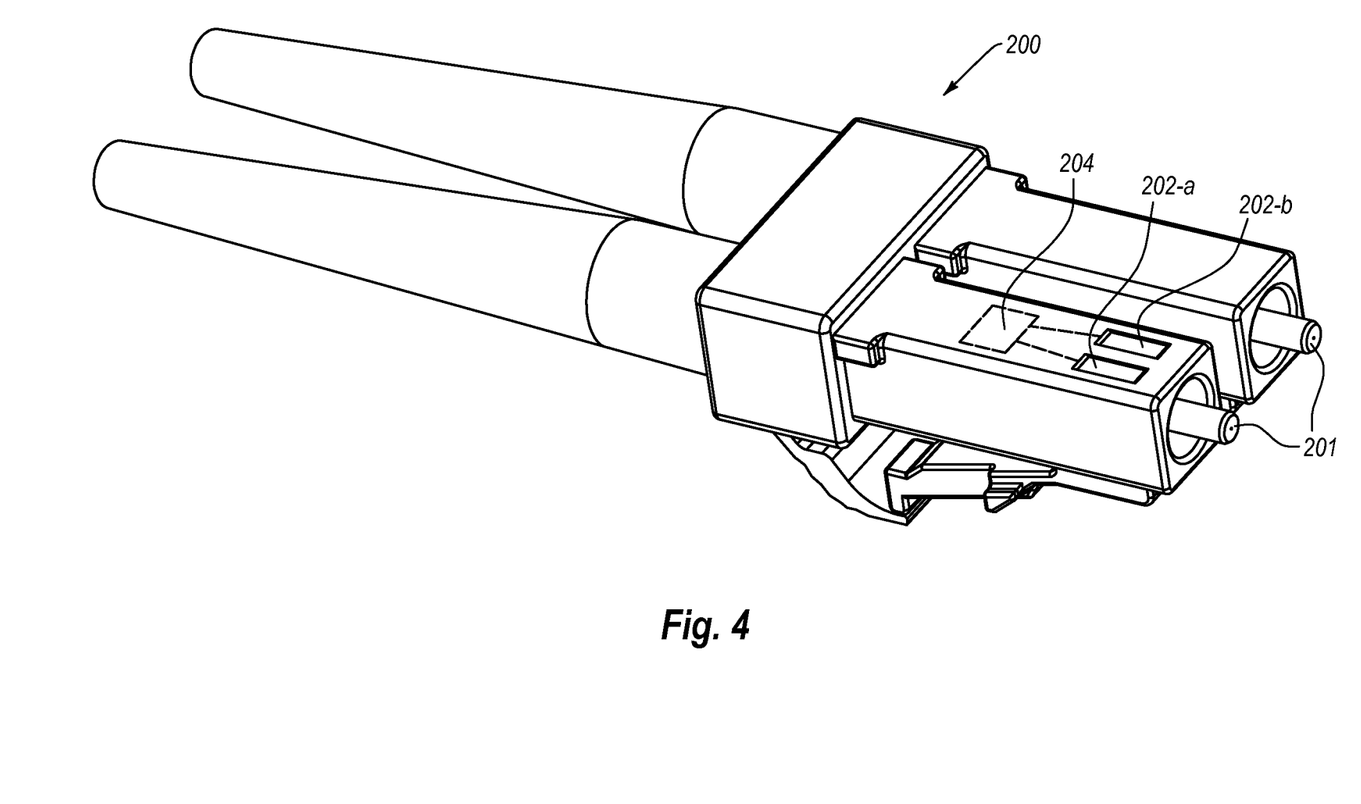
FIG. 4 is a perspective view of an example fiber optic connector uniquely adapted with an electrical interface corresponding to the example electrical interface of FIG. 2.

FIG. 4 shows details of the optical fiber connector 200. The optical fiber connector 200 is used to connect one or more fiber optic cables 201 to the optoelectronic assembly 100. The fiber optic cables 201 may be connected at a remote end to terminal equipment using another optical fiber connector and optoelectronic communications assembly functionally similar to or the same as the optical fiber connector 200 and the optoelectronic communications assembly 100. The optical fiber connector 200 may have a housing of a standard type, such as a fixed connector (FC), a standard connector (SC), a lucent connector (LC), a straight tip (ST) connector, a mechanical transfer registered jack (MTRJ), a toshiba link (TOSLINK), etc.

The housing also includes, however, a unique electrical interface comprising a first exposed electrically conductive contact 202-a and a second exposed electrically conductive contact 202-b. The contacts 202-a and 202-b are positioned on a surface of the housing of the optical connector 200 so as to physically contact corresponding contacts 148-a and 148-b when the optical connector 200 is inserted into the output port 108, (i.e., when the optical connector 200 and the optoelectronic assembly 100 are configured as shown in FIG. 1A).

In a first embodiment of the optical connector 200, the connector contacts 202-a and 202-b are communicatively coupled to an identification device or chip 204 embedded within the optical connector 200. The identification chip 204 contains memory that stores fiber optic identification data that uniquely identifies the particular fiber optic cable coupled to the optical connector 200 from among other fiber optic cables in a local network. In one embodiment the fiber optic identification data also, or alternatively, includes data identifying operational characteristics of the fiber optic cable including, for example, whether the fiber optic cable is multi-mode fiber, single-mode fiber, etc.

An electronic component, such as a processor, on the PCB 120 of the optoelectronic assembly 100 is configured to communicate with the identification chip 204 via the flexible connector 146 and the electrical interface 148. For example, the electronic component of the optoelectronic assembly 100 can request the fiber optic identification data stored in the identification chip 204. The electronic component of the optoelectronic assembly 100 can then store the fiber optic identification data in an on-board memory, thereby recording which fiber optic in the network is assigned to be plugged into and communicate with the associated optoelectronic assembly 100. Consequently, if the fiber optic becomes unplugged, e.g. during a maintenance operation, the identification data can be read from the optoelectronic assembly 100 and the correct fiber optic can be plugged back into its corresponding optoelectronic assembly. In one embodiment the identification data is actively read from the optoelectronic assembly 100 by a processor in the optoelectronic assembly 100 using the interface 148 and the flexible connector 146. In an alternative embodiment, however, the identification chip 204 may actively transmit identification data, and the processor of the optoelectronic assembly 100 may passively receive the identification data.

In a second embodiment of the optical connector 200, the identification chip 204 is omitted and the connector contacts 202-a and 202-b are communicatively coupled to electrically conductive cables or lines extending from the optical connector 200 to a remote connector (not shown). The electrical lines may be encased within a flexible dielectric coating, forming a patch cable or cord. An optical fiber may be absent from the second embodiment of the optical connector 200 or may be present and integrated with the electrically conductive lines extending from the optical connector 200 to the remote connecter. For example, the electrical lines and optional fiber optic cable may both be encased within a flexible dielectric coating to form an electrical/optical patch cord.

The patch cord may be of temporary use when connecting the optoelectronic assembly 100 to a diagnostic meter, which is described in more detail below in connection with FIGS. 5 and 6, whereas a fiber optic cable and connector having the chip 204 and no accompanying electrical lines may be used during normal operation of the optoelectronic assembly 100. However, the different embodiments of the optical connector 200 described above are not limited to the specific uses described above. For example, in some situations it may desirable to use the patch cord in an operational configuration of the optoelectronic assembly 100.

4. Example Diagnostic Meter

Figure 5:
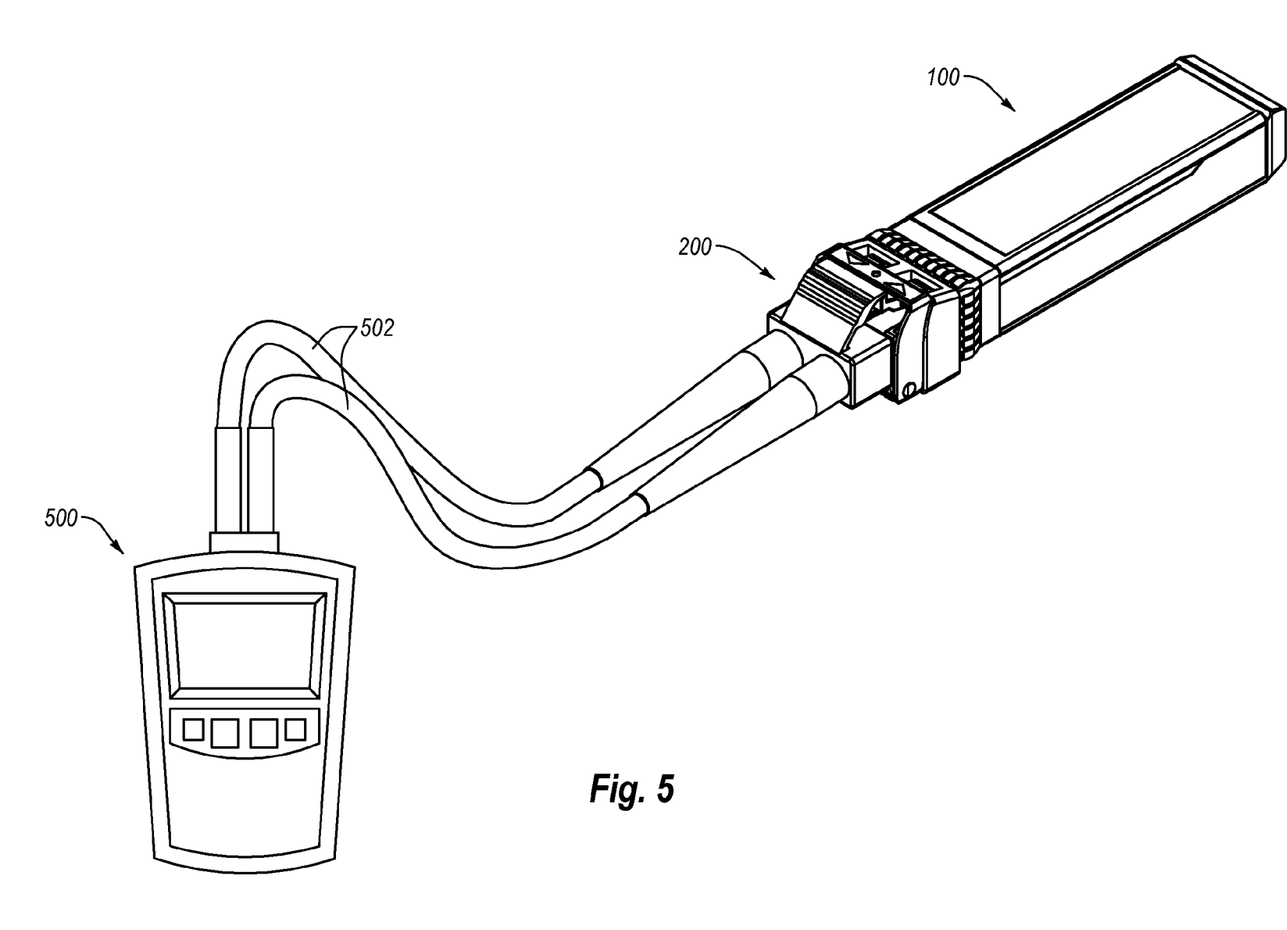
FIG. 5 shows an example configuration of a diagnostic meter coupled to the example optoelectronic communications assembly of FIGS. 1A-1C.
Figure 6:
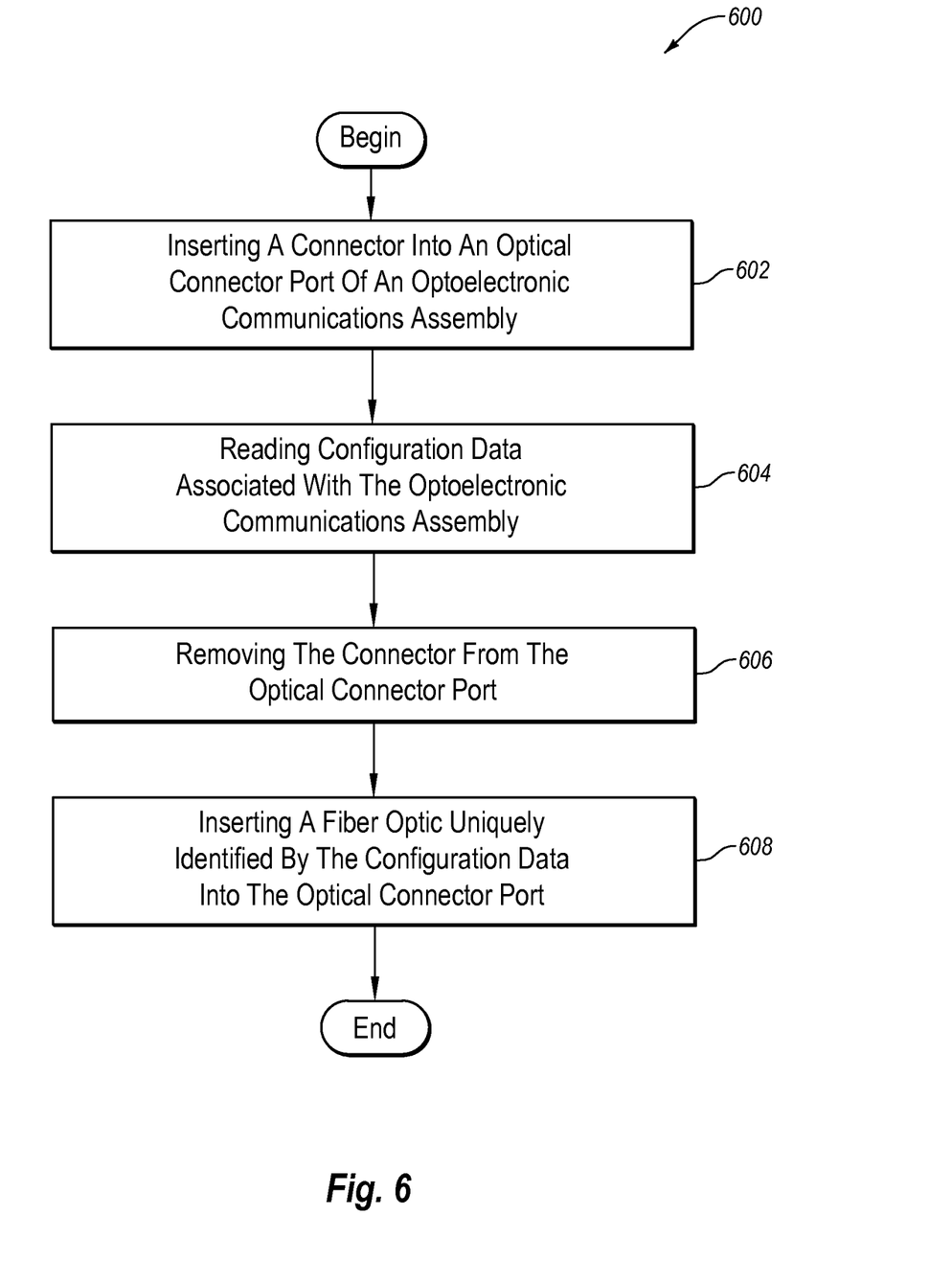
FIG. 6 is an example method of configuring the example optoelectronic communications assembly of FIGS. 1A-1C.

FIGS. 5 and 6 show a configuration and associated method in which the optoelectronic assembly 100 is connected to a diagnostic meter 500 via a patch cord embodiment 502 of the optical connector 200. As described above, in the patch cord embodiment of the optical connector 200, connector contacts 202-a and 202-b are coupled to electrically conductive cables or lines extending from the optical connector 200 to a remote connector. The remote connector is located at the diagnostic meter 500 in the configuration shown in FIG. 5. The diagnostic meter 500 may perform diagnostic functions, such as measuring optical power transmitted from the optoelectronic assembly 100 and measuring receiver sensitivity in the optoelectronic assembly 100.

The meter 500 communicates with a memory device (or an electronic component, such as a processor including or in communication with a memory device) of the optoelectronic assembly 100 to access data stored in the memory device. Communications between the meter 500 and the memory device of the optoelectronic assembly 100 can occur over the following lines and contacts: the electrical communication lines of the patch cord 502, the connector contacts 202-a, 202-b (see FIG. 4), the optoelectronic assembly contacts 148-a, 148-b (see FIG. 2), and the flexible connector 146 (see FIG. 3).

The meter 500 is configured to display data received from the optoelectronic assembly 100 to a user. In certain embodiments, the meter 500 can also transmit commands to write data and/or overwrite previously stored data in the optoelectronic assembly's memory device. Moreover, in an alternative embodiment, the meter 500 lacks diagnostic functions and is instead a special-purpose device configured to read data from (or write/read data to/from) the on-board memory device. In this alternative embodiment, an optical fiber cable may be omitted from the patch cord 502 since only the electrical communication lines of the patch cord 502 are used.

Data received from the optoelectronic assembly 100 may include data uniquely identifying the optoelectronic assembly 100 and/or fiber optic cable identification data previously stored in a memory device of the optoelectronic assembly 100. The fiber optic cable identification data is associated with a fiber optic cable having a connector 200 that includes the identification chip 204 embedded therein, as shown in FIG. 4. The fiber optic cable may be assigned to the optoelectronic assembly 100 according to a predetermined network configuration and may be uniquely identified by its identification data from among other fiber optic cables in the network.

5. Example Method of Configuring an Optoelectronic Communications Assembly

FIG. 6 shows a method 600 for configuring an optoelectronic assembly 100 according to a network configuration that associates a particular fiber optic cable with the optoelectronic assembly 100. According to a first stage 602 of the method 600, a user inserts a connector, such as the optical connector 200, into an optical connector port, e.g., the output port 108 of the optoelectronic communications assembly 100. As described above, the optical connector port 108 includes the electrical interface 148 and the optical connector 200 has a corresponding electrical interface including the connector contacts 202-a and 202-b.

At a second stage 604, configuration data is read via the electrical interfaces. The act of reading may be performed automatically or in response to a user input at communications device, such as the meter 500. The configuration data may include, for example, data that uniquely identifies a fiber optic associated with the optoelectronic communications assembly 100 according to a predetermined network configuration. The configuration data may have been previously stored in a memory device of the optoelectronic communications assembly 100 and may be automatically or manually read by a meter, such as the meter 500, upon insertion of an optical connector that is connected to a patch cord with electrical communication lines, such as the patch cord 502.

At a third stage 606, a user removes the optical connector 200 from the optical connector port 108. Then, at a fourth stage 608, a user identifies the fiber optic uniquely identified by the configuration data and inserts the fiber optic into the connector port 108. The method 600 may be repeated for additional optoelectronic assemblies in a network.

The method 600 is only one example method that may be carried out with the unique optical connector 200 and optoelectronic assembly 100 described above. Other methods are contemplated in which the stages vary from those described above. For example, additional stages may be added or some stages may be reordered, altered, or even omitted. In one alternative method performed at a time of initial configuration of the optoelectronic assembly 100, the stages 606 and 608 may be omitted. In addition, the configuration data read at the stage 604 may be read by the optoelectronic assembly 100 upon insertion of an optical connector having an identification chip, such as the identification chip 204, embedded therein. An additional stage (not shown) may then be performed in which the configuration data is written or stored in the memory device of the optoelectronic assembly 100. Alternatively, the configuration data may overwrite previously written configuration data.

The foregoing detailed description of various embodiments is provided by way of example and not limitation. For example, other embodiments are contemplated in which the optoelectronic assembly 100 is an optoelectronic transmitter assembly having only a TOSA or an optoelectronic receiver assembly having only a ROSA. In such one-way communications embodiments, the electrical interface 148 may be located within either the unused port or within the used port. Furthermore, although the electrical interface 148 is depicted on a bottom wall of an optical port, any suitable location, such as a sidewall or a top wall, may instead be used. In addition, the flexible connector 146 may be directly attached to the PCB 120, as shown in FIG. 3, or may make a connection to the PCB 120 via one of the flexible connectors 116 and 118. For example, one of the flexible connectors 116 and 118 may have a Y-shaped configuration, with a portion of its conductive lines coupling circuitry on the PCB 120 to the TOSA 112 or ROSA 114 (as the case may be) and another portion of its conductive lines extending into the depression 150 shown in FIG. 2 to couple circuitry on the PCB 120 to the electrical contacts 148-a and 148-b.

Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A communications media comprising:
a first fiber optic connector that physically conforms with a fiber optic connector standard, wherein the first fiber optic connector is disposed at a first end of the communications media and includes a first electrical contact exposed on a side thereof;
an electrical conductor electrically coupled to the first electrical contact and extending therefrom to a second end of the communications media opposite the first end;
a fiber optic attached to the first fiber optic connector and extending therefrom to the second end of the communications media; and
a second fiber optic connector that physically conforms with the fiber optic connector standard, the second fiber optic connector being attached to the fiber optic at the second end of the communications media, the second fiber optic connector including a second electrical contact exposed on a side thereof,
wherein the electrical conductor electrically couples the second electrical contact at the second end of the communications media to the first electrical contact at the first end of the communications media.

2. A communications system comprising the communications media of claim 1, and further comprising an optoelectronic communications assembly having an optical connector port configured to mate with the first fiber optic connector,
wherein the first electrical contact is positioned to electrically contact a corresponding electrical contact on an inner wall of the optical connector port.

3. An optical diagnostics meter configured to make optical diagnostic measurements of an optoelectronic communications assembly, the optical diagnostics meter comprising:
a first optical connector port that physically conforms with a fiber optic connector standard and includes a plurality of walls forming an opening that is configured to receive a corresponding optical connector, an inner side of one of the plurality of walls having a first electrical interface; and
a display,
wherein the optical diagnostics meter is configured to:
electrically couple to the optoelectronic communications assembly and receive data associated with the optoelectronic communications assembly via a communications media coupled between the first electrical interface and a corresponding second electrical interface located on a second optical connector port of the optoelectronic communications assembly, and
display the received data associated with the optoelectronic communications assembly on the display.

4. The optical diagnostics meter of claim 3, wherein the first electrical interface comprises an exposed electrical contact on an inner side of one of the plurality of optical connector port walls.

5. The optical diagnostics meter of claim 4, wherein the exposed electrical contact is a leaf spring contact.

6. The optical diagnostics meter of claim 3, wherein the optical diagnostics meter is further configured to optically couple to the optoelectronic communications assembly and to perform a diagnostic function.

7. The optical diagnostics meter of claim 6, wherein the diagnostic function includes measuring optical power transmitted from the optoelectronic assembly.

8. The optical diagnostics meter of claim 6, wherein the diagnostic function includes measuring sensitivity of a receiver of the optoelectronic assembly.

9. The optical diagnostics meter of claim 3, wherein the optical diagnostics meter is further configured to transmit commands to write data to a memory of the optoelectronic communications assembly.

10. The optical diagnostics meter of claim 3, wherein the received data associated with the optoelectronic communications assembly includes data uniquely identifying a fiber optic associated with the optoelectronic communications assembly according to a predetermined network configuration.

11. The optical diagnostics meter of claim 3, wherein the communications media includes:
a first fiber optic connector that physically conforms with a fiber optic connector standard, the first fiber optic connector including a first electrical contact exposed on a side thereof;
a second fiber optic connector that physically conforms with the fiber optic connector standard, the second fiber optic connector including a second electrical contact exposed on a side thereof; and
an electrical conductor electrically coupled to the first electrical contact and the second electrical contact such that the electrical conductor electrically couples the first electrical contact to the second electrical contact.

12. The optical diagnostics meter of claim 11, wherein the communications media further includes a fiber optic attached to the first fiber optic connector and extending therefrom to the second end of the communications media.

13. A method for configuring an optoelectronic communications assembly comprising:
inserting a first connector into an optical connector port of the optoelectronic communications assembly including a memory device, the optical connector port having a port electrical interface and the first connector having a corresponding first connector electrical interface;

reading configuration data associated with the optoelectronic communications assembly from the memory device via the port and first connector electrical interfaces, the configuration data including data uniquely identifying a fiber optic associated with the optoelectronic communications assembly according to a predetermined network configuration, the fiber optic including a second connector;

removing the first connector from the optical connector port; and inserting the second connector of the fiber optic associated with the optoelectronic communications assembly according to a predetermined network configuration into the optical connector port.

14. The method of claim 13, wherein the optical connector port includes a plurality of walls forming an opening that is configured to receive the first or second connector, and wherein the optical connector port electrical interface comprises an exposed electrical contact on an inner side of one of the plurality of optical connector port walls.

15. The method of claim 13, wherein the configuration data is read by an optical diagnostics meter.

16. The method of claim 15, wherein the configuration data is read by the optical diagnostics meter via a communication media including:

the first connector including a first fiber optic connector that physically conforms with a fiber optic connector standard, the first fiber optic connector including the first connector electrical interface;

a second fiber optic connector that physically conforms with the fiber optic connector standard, the second fiber optic connector including a second connector electrical interface; and an electrical conductor electrically coupled to the first connector electrical interface and the second connector electrical interface such that the electrical conductor electrically couples the first connector electrical interface to the second connector electrical interface.

17. The method of claim 16, wherein the communication media further includes a fiber optic attached to the first fiber optic connector and extending therefrom to the second end of the communications media.

18. The method of claim 16, further comprising inserting the second fiber optic connector into the optical diagnostics meter.

* * * * *